(12) United States Patent
Wilson

(10) Patent No.: US 11,019,054 B2
(45) Date of Patent: May 25, 2021

(54) METHOD, FIRST DEVICE, SECOND DEVICE AND SERVER FOR PROVING USER INFORMATION WITH AUTHENTICATION DATA ISSUED BY THE SERVER AND VERIFIED ON-LINE

(71) Applicant: GEMALTO SA, Meudon (FR)

(72) Inventor: John Philip Wilson, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 81 days.

(21) Appl. No.: 15/569,481

(22) PCT Filed: Apr. 28, 2016

(86) PCT No.: PCT/EP2016/059529
§ 371 (c)(1),
(2) Date: Oct. 26, 2017

(87) PCT Pub. No.: WO2016/174158
PCT Pub. Date: Nov. 3, 2016

(65) Prior Publication Data
US 2018/0302224 A1    Oct. 18, 2018

(30) Foreign Application Priority Data
Apr. 30, 2015    (EP) .................................... 15305670

(51) Int. Cl.
*H04L 29/06* (2006.01)
*H04W 12/02* (2009.01)
(Continued)

(52) U.S. Cl.
CPC ........ *H04L 63/0853* (2013.01); *H04L 9/3231* (2013.01); *H04W 12/02* (2013.01); *H04W 12/033* (2021.01); *H04W 12/068* (2021.01)

(58) Field of Classification Search
CPC ... H04L 63/0853; H04L 9/3231; H04W 12/02
See application file for complete search history.

(56) References Cited

U.S. PATENT DOCUMENTS

| 8,083,130 B1 | 12/2011 | Cipriano |
| 8,261,320 B1 * | 9/2012 | Serenyi ................. G06F 16/958 726/2 |

(Continued)

FOREIGN PATENT DOCUMENTS

| EP | 2434719 A1 * | 3/2012 | ......... H04L 63/0853 |
| EP | 2 439 969 A1 | 4/2012 | |

(Continued)

OTHER PUBLICATIONS

International Search Report (PCT/ISA/210) dated Jul. 14, 2016, by the European Patent Office as the International Searching Authority for International Application No. PCT/EP2016/059529.

(Continued)

*Primary Examiner* — Taghi T Arani
*Assistant Examiner* — Lin Chang
(74) *Attorney, Agent, or Firm* — Buchanan Ingersoll & Rooney PC

(57) ABSTRACT

A method and system for providing proof of personal information includes a first device sending a request to a server for proving user information and data identifying a requester. The server generates (i) requester authentication data and associated data identifying a transaction, and (ii) a proof of user information using the user information and the requester authentication data. The server then sends the proof of user information and the associated data identifying the transaction to the first device. A second device sends to the server a request for getting authentication data associated with data identifying a transaction and the associated data identifying the transaction. In response to the request, the server sends authentication data associated with the data (Continued)

identifying the transaction to the second device. The second device or a verifier may then authenticate the user information only if the received authentication data matches the requester authentication data.

9 Claims, 1 Drawing Sheet

(51) Int. Cl.
*H04W 12/033* (2021.01)
*H04W 12/06* (2021.01)
*H04L 9/32* (2006.01)

(56) References Cited

U.S. PATENT DOCUMENTS

| | | | |
|---|---|---|---|
| 2012/0088473 A1* | 4/2012 | Jussila | H04W 12/0608 455/411 |
| 2014/0032723 A1 | 1/2014 | Nema | |
| 2014/0101743 A1* | 4/2014 | Busboom | H04L 63/0815 726/7 |
| 2014/0215589 A1* | 7/2014 | Dietrich | G06F 21/34 726/6 |
| 2015/0220914 A1* | 8/2015 | Purves | G06Q 20/36 705/26.8 |
| 2015/0262170 A1 | 9/2015 | Bouda | |
| 2016/0027009 A1* | 1/2016 | Sivashanmugam | H04L 63/083 705/21 |
| 2016/0275500 A1* | 9/2016 | Buchholtz | G06Q 20/4012 |

FOREIGN PATENT DOCUMENTS

| | | |
|---|---|---|
| EP | 2 592 589 A1 | 5/2013 |
| EP | 2 819 078 A1 | 12/2014 |
| WO | WO 2012/135932 A1 | 10/2012 |
| WO | WO 2014/048990 A1 | 4/2014 |

OTHER PUBLICATIONS

Office Action (Patent Examination Report No. 2) dated Jul. 14, 2020, by the Australian Patent Office in corresponding Australian Patent Application No. 2016254271. (7 pages).

* cited by examiner

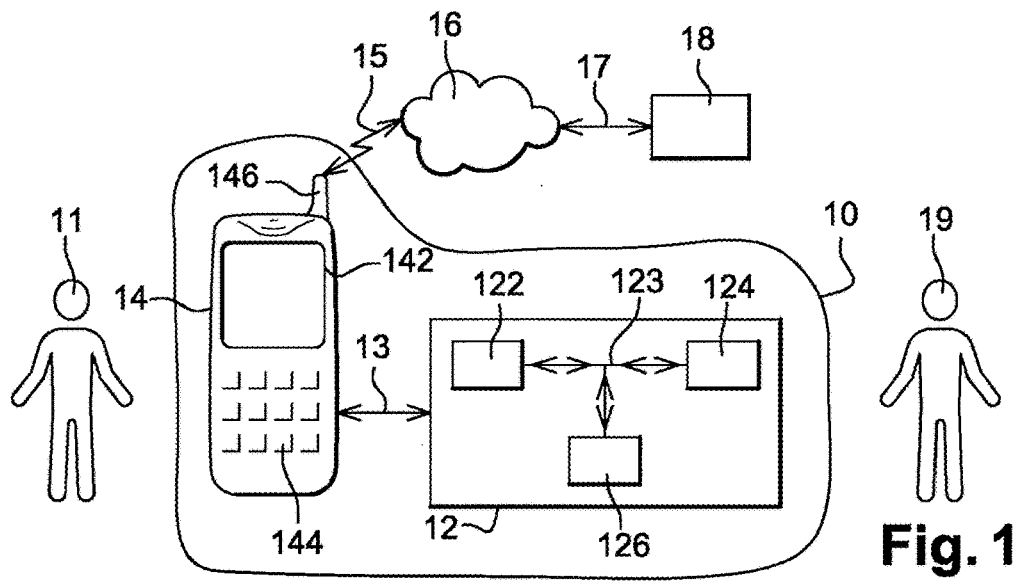
Fig. 1
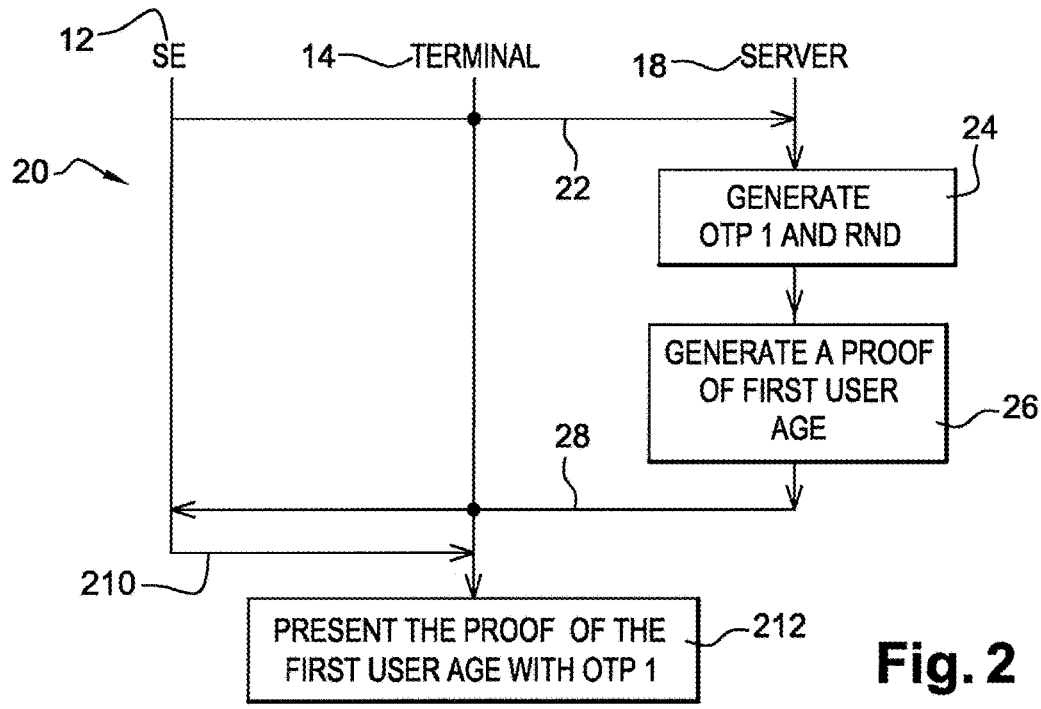
Fig. 2
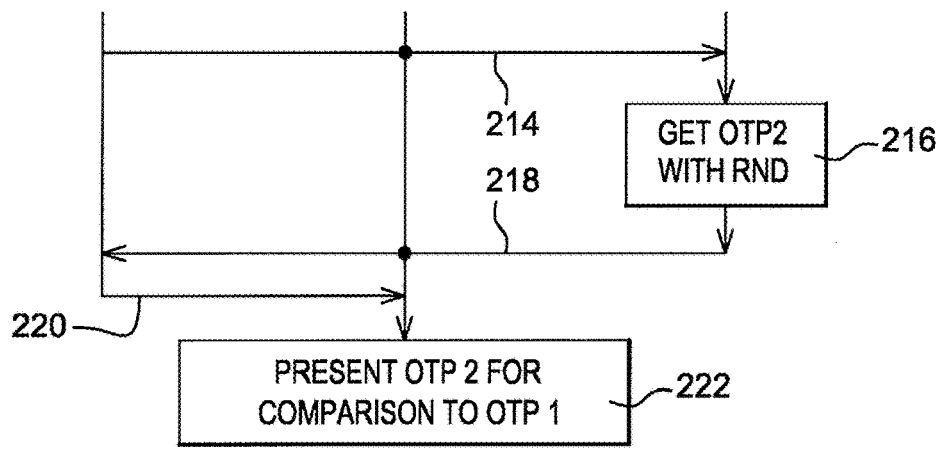

METHOD, FIRST DEVICE, SECOND DEVICE AND SERVER FOR PROVING USER INFORMATION WITH AUTHENTICATION DATA ISSUED BY THE SERVER AND VERIFIED ON-LINE

FIELD OF THE INVENTION

The invention relates generally to a method for proving at least one piece of user information.

Furthermore, the invention also pertains to a requester device for proving at least one piece of user information.

Moreover, the invention relates to a verifier device for proving at least one piece of user information.

Finally, the invention pertains to a server for proving at least one piece of user information as well.

STATE OF THE ART

Nowadays, privacy is becoming a major concern. As known per se, a person who desires to enter a bar, i.e. access a restricted service, has to prove her or his age. Today, the person presents a bartender, as a service provider, a proof of age, such as a driving license card or any other (valid) identity document, that indicates a date of birth.

However, such a presentation of proof of age raises a clear privacy issue since the service provider can also read other piece(s) of personal information from the presented identity document.

Thus, there is a need to provide a solution that allows providing a proof of a piece of personal information without revealing any other piece of personal information of the concerned person.

SUMMARY OF THE INVENTION

The invention proposes a solution for satisfying the just herein above specified need by providing a method for proving at least one piece of user information.

According to the invention, the method comprises the following steps. A requester device sends to a server a first message including a request for proving at least one piece of user information and data identifying a requester. The server generates requester authentication data and associated data identifying a transaction. The server generates a proof of user information using the at least one piece of user information and the requester authentication data. The server sends to the requester device a second message including, as a request response, the proof of user information and the associated data identifying the transaction. A verifier device sends to the server a third message including a request for getting authentication data associated with data identifying a transaction and the associated data identifying the transaction. The server sends to the verifier device a fourth message including, as a request response, authentication data associated with the data identifying the transaction. The verifier device or a verifier authenticates the at least one piece of user information only if the received authentication data matches the requester authentication data.

The principle of the invention consists in that a user device requests from a server a proof of one or several pieces of user information by providing data that allows identifying the concerned user. Then, the server determines data for authenticating the user, as a requester, and associated data that allows identifying a transaction. The server also determines a proof of user information based on the piece(s) of requester information to be proven and the requester authentication data. The server transmits to the user device the proof of user information along with the associated transaction (identifying) data. A user device, as a verifier device, transmits to the server a request for retrieving authentication data associated with data identifying the transaction. The server sends to the verifier device authentication data associated with the received transaction (identifying) data. The verifier device or its user (namely the verifier) is able, if the received authentication data is the requester authentication data, to validate that the requester information piece(s) is genuine. Otherwise, i.e. if the received authentication data is not the requester authentication data, the verifier device or the verifier ascertains that the requester information piece(s) is(are) not genuine.

It is to be noted that the proof of user information may be of any type of data. For instance, the proof of user information may comprise one or several visual elements and/or one or several sound elements.

It is noteworthy that the requester authentication data may be of any type. The requester authentication data may be a password, a passphrase or any other credential. Furthermore, the requester authentication data may be restricted in use, like e.g. in a predefined time period or for a predefined threshold value of use, such as a One Time Password (or OTP), or permanent. The requester authentication data that may be user dependent, like e.g. particular biometric data, such as a particular fingerprint amongst several ones, is to be provided by or through the requester.

Contrary to the aforementioned prior art solution, the invention solution allows preserving a privacy of the concerned requester by avoiding disclosing any other unnecessary information item about the concerned person.

Compared to the aforementioned prior art solution, the invention solution is based on an on-line proof of user information that lets involve a server and that can be verified at a client side.

The proposed solution is secure since it uses a proof of user information that uses requester authentication data and associated transaction identifying data that are both issued from the server and that the verifier device or its user can verify.

The proposed invention solution may be automatic as it does not need to let manually intervene a requester or a verifier.

The proposed invention solution is therefore convenient for the user, except from a possible voluntary action(s) or user authentication, so as to get data from a server.

According to a further aspect, the invention is a server for proving at least one piece of user information.

According to the invention, the server is configured to receive from a requester device a first message including a request for proving at least one piece of user information and data identifying a requester. The server is configured to generate requester authentication data and data identifying a transaction and generate a proof of user information using the at least one piece of user information and the requester authentication data. The server is configured to send to the requester device a second message including, as a request response, the proof of user information and the data identifying the transaction. The server is configured to receive from a verifier device a third message including a request for getting authentication data associated with data identifying a transaction and the data identifying the transaction. And the server is configured to send to the verifier device a fourth message including, as a request response, the requester authentication data associated with the data identifying the transaction.

The server may be operated by an official authority, like e.g. a state or a government, or on its behalf.

According to still a further aspect, the invention is a requester device for proving at least one piece of user information.

According to the invention, the requester device is configured to send to a server a first message including a request for proving at least one piece of user information and data identifying the requester. The requester device is configured to receive from the server a second message including, as a request response, a proof of the user information and associated data identifying a transaction.

As a requester device, it may be any electronic device comprising data processing means, data storing means and one or several Input/Output (or I/O) communication interfaces.

The requester device may be a (user) terminal, an embedded chip or a smart card, as a Secure Element (or SE).

Within the present description, an SE is a smart object that includes a chip that protects, as a tamper resistant component, physically access to stored data and is intended to communicate data with the outside world, like e.g. a mobile (tele)phone, as an SE host device.

As a user terminal, it may be, for instance, a mobile phone, a tablet, a game console, a netbook, a Personal Digital Assistant (or PDA), a Personal Computer (or PC), a mobile laptop and/or an electronic mobile equipment or user accessory (e.g.: glasses, a watch or a jewel).

The invention does not impose any constraint as to a kind of the SE type.

As a removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card, a Multi-Media type Card (or MMC) or any other format card to be coupled or connected to a host device, like e.g. a terminal.

Instead of a removable SE, the SE may be embedded, like e.g. an embedded Universal Integrated Circuit Card (or eUICC), as a chip incorporated within a host device, such as a user terminal.

According to still a further aspect, the invention is a verifier device for proving at least one piece of user information.

According to the invention, the verifier device is configured to send to a server a third message including a request for getting authentication data associated with data identifying a transaction and the data identifying the transaction. And the verifier device is configured to receive from the server a fourth message including, as a request response, authentication data associated with the data identifying the transaction.

It is noteworthy that the verifier device may be the requester device or any other device separate from the requester device.

As a verifier device, it may be any electronic device comprising data processing means, data storing means and one or several I/O communication interfaces.

The verifier device may be a terminal, a user terminal or an SE.

As a user terminal, it may be, for instance, a mobile phone, a tablet, a game console, a netbook, a PDA, a PC, a mobile laptop and/or an electronic mobile equipment or user accessory (e.g.: glasses, a watch or a jewel).

The invention does not impose any constraint as to a kind of the SE type.

As a removable SE, it may be a SIM type card, an SRM, a smart dongle of the USB type, a (micro-)SD type card, a MMC or any other format card to be coupled or connected to a host device, like e.g. a terminal.

Instead of a removable SE, the SE may be embedded, like e.g. an eUICC, as a chip incorporated within a host device, such as a user terminal.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings:

FIG. 1 illustrates a simplified schematic view of a mobile Terminal Equipment (or TE) and a server, the TE being arranged to send to a server a request for proving a first user age along with a first user identifier, the server being arranged to issue a proof of a first user age and an associated transaction identifier and the TE being further arranged to send to the server a request for getting authentication data along with the transaction identifier and to receive from the server authentication data associated with the transaction identifier, according to the invention; and FIG. 2 is an example of one flow of messages exchanged between an SE embedded within a terminal of the TE, the terminal and the server of FIG. 1, so that, firstly, the SE carries out a transmission of a request for proving a first user age with a first user identifier, a reception of a proof of the first user age that may include first user authentication data and associated transaction identifier, a transmission of a request for getting authentication data along with the associated transaction identifier, a reception of the authentication data, so as to allow an SE second user to validate (or not) that the first user age is genuine.

DETAILED DESCRIPTION

Herein under is considered an embodiment in which the invention method for proving at least one piece of user information is implemented, at a client side, by a TE with a mobile terminal that includes an eUICC, as an SE.

Alternatively, the SE, instead of being constituted by an eUICC, is a Trusted Execution Environment (or TEE), as a secure area of the main processor of the terminal and a secured runtime environment, or a Trusted Platform Module (or TPM) that performs the functions that the SE performs and that are described infra.

According to another embodiment, at the client side, the device, as a standalone device, like e.g. a mobile phone, does not cooperate with any other device, so as to prove a piece(s) of user information.

Naturally, the herein below described embodiment is only for exemplifying purposes and is not considered to reduce the scope of the invention.

FIG. 1 shows schematically two users 11 and 19, a mobile Terminal Equipment 10 that includes a chip 12 and a mobile phone 14 and that is connected over a mobile network 16 to a remote server 18.

For sake of simplicity, the chip 12, the mobile phone 14 and the remote server 18 are termed infra the SE 12, the phone 14 and the server 18 respectively.

Only one user terminal 14 with one SE 12 is represented at a client side. Nevertheless, the invention is also applicable to several user terminals with none, one or several SEs, at the client side.

One and the same TE 10 is used by firstly a first user 11, as a requester of a proof(s) of one or several pieces of user information, and, secondly, a second user 19, as a verifier of the validity of the user information piece(s).

Likewise, only one server is represented at a server side. However, the invention is still applicable to several servers that carry out each part of the functions that are performed by the server as described infra.

The SE 12 is soldered to a Printed Circuit Board (or PCB) of the phone 14.

The phone 14, as an SE 12 hosting device, incorporates the SE 12.

Alternately, instead of cooperating with the SE 12, the phone 14 stores, within its own memory (not represented), data stored within the SE 12 as described infra.

The SE 12 belongs to a phone 14 user, as a first user and a requester of a proof(s) of one or several pieces of user information.

The requester may be a subscriber to a service operator and a mobile (radio-communication) network 16 operator.

The SE 12 includes one (or several) microprocessor(s) 122, as data processing means, one (or several) memory(ies) 124, as data storing means, and one (or several) I/O interface(s) 126 that are internally all connected, through an internal bidirectional data bus 123, to each other.

The I/O interface(s) 126 allow(s) communicating data from the internal chip components to the chip exterior and conversely.

The memory 124 stores preferably data relating to one or several wireless services.

The memory 124 stores, preferably in a secure manner, one or several sets of data relating, each, to a subscription to a mobile network(s). Each set of data, as wireless service data, allows accessing, Over The Air (or OTA) and a mobile network 16, the server 18.

Alternately or additionally, the memory 124 stores data, like e.g. a Wired Equivalent Privacy type key(s), as wireless service data, for accessing, Over The Internet (or OTI), the server 18.

Each set of data relating to one subscription to one (or several) network(s) includes:
- an International Mobile Subscriber Identity (or IMSI), as a subscriber and a service subscription identifier for accessing a mobile network 16;
- a key Ki, as a network authentication key, allowing to authenticate the concerned subscriber to the mobile network 16;
- Milenage, as an authentication algorithm, allowing to authenticate the concerned subscriber to the mobile network 16;
- one or several passwords, like e.g. a Personal Identity Number (or PIN), biometric data and/or one or several cryptographic algorithm(s), as data relating to secret(s);
- a file system including one or several Elementary Files (or EF);
- one or several security keys, like e.g. a key(s) for ciphering/deciphering data and/or a key(s) for signing data a key(s); and/or
- one or several credentials, like e.g. a user name and/or an IDentifier (or ID) of the subscriber, as data relating to the user.

The memory 124 stores preferably one (or several) SIM type application(s).

The SIM type application(s) includes, among others, a SIM application for a Global System for Mobile communication (or GSM) type network, a Universal Subscriber Identity Module (or USIM) application for a Universal Mobile Telecommunications System (or UMTS) type network, a Code Division Multiple Access (or CDMA) Subscriber Identity Module (or CSIM) application and/or an Internet protocol Multimedia Subsystem (or IMS) Subscriber Identity Module (or ISIM) application.

The SIM type application(s) allow(s) the SE 12 hosting device, like e.g. the phone 14, to authenticate to one (or several) mobile network(s) 16 by using the one (or several) subscription identifier, like e.g. the IMSI, and a corresponding network authentication key, like e.g. the Ki.

The microprocessor 122 processe(s), control(s) and communicate(s) internally data with all the other components incorporated within the SE 12 and, through the I/O interface(s) 126, with the chip exterior.

The microprocessor 122 executes an Operating System (or OS) and one or several applications.

The microprocessor 122 executes, in a preferred manner, one or several security applications.

The security applications include preferably a user authentication process to be used prior to accessing the memory 124 and/or prior to exchanging a message with the server 18. To authenticate successfully the requester and/or the verifier, the concerned user has to provide a PIN, biometric data and/or the like, as user reference authentication data, that has to match the user reference authentication data that is(are) securely stored within the memory 124.

The microprocessor 122 is preferably able to initiate actions, in order to interact directly with the outside world, in an independent manner of the SE hosting device. Such a capacity of interaction at the initiative of the SE 12 is also known as a proactive capacity, in which the SE 12 plays a role of a master while the phone 14 plays a role of a slave. The SE 12 is thus able to send, at its own initiative, through the phone 14, to any device connected to the phone 14, like e.g. the server 18, a proactive command, such as "send Short Message", for sending data, such as a message including a request for getting a proof(s) of one or several pieces of user information.

The microprocessor 122 accesses and executes preferably one or two invention applications, namely an application for a requester (of a proof of user information), as a requester application, and/or an application for a verifier (of corresponding authentication data), as a verifier application.

Alternatively, instead of being supported by the SE 12, the phone 14 stores and executes one or two invention applications, namely the requester application and/or the verifier application.

The SE 12 is able to receive, through a Man Machine Interface(s) (or MMI), data that originates from any user, like e.g. notably the requester and/or the verifier, after a preferable user authentication carried out by the SE 12. Such a user authentication is not necessary. The MMI may be constituted an MMI of the SE 12, an MMI of the phone 14 and/or an MMI of another device which the SE 12 is connected or coupled to. The MMI may include one or several display screens and/or one or several keyboards.

According to an important invention feature, the SE 12, as a requester device, is configured to send to the server 18 a message including a request for proving one or several pieces of user information along with the IMSI, an International Mobile Equipment Identity (or IMEI) and/or a Mobile Station International Subscriber Directory Number (or MSISDN), as data identifying the requester.

The data identifying the requester may be provided to the server 18 by or through the SE 12 or any other device involved within a communication channel from the SE 12 to the server 18, like e.g. the phone 14 or a mobile network entity, such as a Home Location Register (or HLR).

Optionally, prior to a sending of such a request message, the SE 12 signs data to be sent. To sign the data to be sent, the SE 12 uses a private key K1priv relating to the SE 12 and a data signature algorithm, like e.g. a River Shamir and Adleman (or RSA) type algorithm, that are both stored within the memory 124. A resulting SE signature allows proving that the originator of the request message is the SE 12.

Optionally, prior to a sending of the request message, the SE 12 ciphers data to be sent. To cipher the data to be sent, the SE 12 uses either a public key relating to the server 18 or a key shared between the SE 12 and the server 18 and a data ciphering algorithm, like e.g. a Data Encryption Standard (or DES) or 3DES type algorithm. Resulting ciphered data allows protecting the concerned data during its transfer to its addressee.

According to an important invention feature, the SE 12, as a requester device, is configured to receive from the server 18 a message including, as a request response, a proof of first user information and associated data identifying a transaction.

The proof of first user information to be issued by the server 18 may be presented, through the SE 12, to the original requester.

To present the proof of first user information, the SE 12 may use one or several MMI(s), like e.g a display screen and/or a loudspeaker, that the SE 12 comprises and/or which the SE 12 is connected to.

The proof of user information may include one or several visual elements, one or several sound elements and/or other data.

When there is(are) a visual element(s), at least some of the visual element(s) may be visible (or not) to a human with or without any particular glasses or device.

To present the visual element(s), the SE 12 may use a phone display screen 142.

The visual element(s) may include data relating to the first user 11, like e.g. one or several pictures, one or several facial images, one or several palm prints, one or several fingerprints, one or several iris prints and/or other data relating to the first user 11.

The visual element(s) may include data issued by the server 18, like e.g. data relating to a first user authentication and/or data identifying a transaction, that may be presented at least in part through any data format, like e.g. in plain text, one or several bar codes, one or several Quick Response (or QR) codes, as two Dimension (or D) codes, one or several flash codes and/or one or several bocodes, as three D codes. The first user 11, as the requester, and/or the second user 19, as the verifier, may be not able to access her or his authentication data provided by the server 18.

When there is(are) a sound element(s), at least some of the sound element(s) may be audible (or not) to a human with or without any particular earphone or device.

The data identifying a transaction to be issued by the server 18 and associated with the proof of the first user information may be a random or any other data generated at the server side.

According to an important invention feature, the SE 12, as a verifier device, is configured to send to the server 18 a message including a request for getting authentication data and associated with data identifying a transaction and the data identifying the transaction.

Such requested authentication data relates to a requester, like e.g. the first user 11.

Prior to a sending of such a request message, the data identifying the transaction may have been provided by either the SE 12, as the requester device, or the second user 19. The data identifying the transaction is the one that has been previously received by the SE 12, as the requester device, from the server 18.

Optionally, prior to a sending of such a request message, the SE 12, as the verifier device, signs data to be sent. To sign the data to be sent, the SE 12 uses a private key K2priv relating to the SE 12 and a data signature algorithm, like e.g. an RSA type algorithm, that are both stored within the memory 124. A resulting SE signature allows proving that the originator of the request message is the SE 12, as the verifier device. Optionally, prior to a sending of the request message, the SE 12 ciphers data to be sent. To cipher the data to be sent, the SE 12 uses either a public key relating to the server 18 or a key shared between the SE 12 and the server 18 and a data ciphering algorithm, like e.g. a DES or 3DES type algorithm.

According to an important invention feature, the SE 12, as the verifier device, is configured to receive from the server 18 a message including, as a request response, authentication data associated with the data identifying the transaction and the data identifying the transaction.

The SE 12 may be further configured to interpret at least the received authentication data, so as to compare by the SE 12 the received authentication data to requester authentication data.

Optionally, the SE 12, as a verifier device, validates or authenticates the piece(s) of the first user 11 information only if the received authentication data matches requester authentication data. The requester authentication data may have been previously provided by either the requester device (even if separate from the verifier device) or the verifier 19 that accesses the requester authentication data possibly with another device allowing to decode the requester authentication data, when necessary, i.e. notably if not in plain text.

Alternately, instead of the SE 12, the second user 19 validates or authenticates the piece(s) of the first user 11 information only if the received authentication data matches requester authentication data.

Once the concerned piece(s) of the first user 11 information is authenticated, the SE 12 may be further arranged to get service data. The service data allows accessing a service.

The SE 12 is connected, through a bi-directional contact (or contact-less) link 13, to the phone 14.

The phone 14 is preferably able to interact with the SE 12, so as to identify and authenticate, in particular, to the mobile network 16.

The phone 14 is preferably provided with a display screen 142 and a keyboard 144, as an MMI. The MMI allows a phone user, the first 11 or the second 19 user, to interact with notably the SE 12.

Alternately, instead of a separate keyboard 144, the phone 14 is equipped with a touch display screen (not represented) that incorporates a virtual keyboard that is displayed.

The phone 14 is preferably further provided with a loudspeaker and a microphone, as MMI.

The phone 14 includes one or several (micro)processors (not represented), as data processing means, volatile and non-volatile memories (not represented), as means for storing data, and one or several I/O interfaces (not represented) linked together through a data and control bus (not represented).

The phone processor processes and controls data within the phone 14 and/or data to be exchanged with outside of the phone 14. The processor controls and communicates with all the components of the phone 14, such as the I/O interfaces.

The phone 14 memories store data notably relating to an OS and applications supported by the phone 14.

The phone 14 memories may be constituted by one or several EEPROMs (acronym for "Electrically Erasable Programmable Read-Only Memory"), one or several ROMs (acronym for "Read Only Memory"), one or several Flash memories, and/or any other memories of different types, like one or several RAMs (acronym for "Random Access Memory").

The phone 14 memory stores an International Mobile Equipment Identity (or IMEI) and/or an email address, as an identifier(s) relating to the phone 14.

The phone 14 has an antenna 146 that allows communicating, OTA, via a Long Range (or LR) Radio-Frequency (or RF) link 15, through the mobile network(s) 16, with the server 18.

The mobile network(s) 16 may include one or several cellular communication networks, like e.g. a Global System for Mobile Communications (or GSM), a General Packet Radio Service (or GPRS), a Universal Mobile Telecommunications System (or UMTS), an EDGE (acronym for "Enhanced Data Rates for GSM Evolution"), a Code Division Multiple Access (or CDMA) and/or a Long Term Evolution (or LTE) type network(s).

Such a cellular communication network set is not exhaustive but only for exemplifying purposes.

The phone 14 includes another antenna (not represented) and preferably a chip (not represented) that both allow communicating, via a Short Range (or SR) RF link, with an external contact-less device, like e.g. a set-top box.

The server 18 is connected, through a bi-directional link 17, to the mobile network 16.

The server 18, as a Trusted Service Provider (or TSP), may be operated by a state, a government, any other authority or on its behalf.

The server 18 is accessible OTA and preferably OTI as well.

The server 18, as addressee of information to be sent by a client device, like e.g. the SE 12, as a requester device and/or a verifier device, may be identified by a URI, like e.g. a URL, a call phone number of a server, a video-conference call phone number of a server, an Internet address and/or an email address of a server relating to a service provider, as a server identifier(s).

The server 18 is hosted by a computer with data processing means and data storing means.

The server 18 may support a signature verification application. To verify a received signature S, the server 18 may analyze whether the following predetermined mathematical formula, as one example, is satisfied:

$$S^v \bmod m = M;$$

in which:

S represents the signature;

mod denotes the modulo function;

(v, m) represents a couple of parameters relating to the public key K1pub or K2pub in which v is a public exponent and m represents the RSA type modulus; and M denotes data to be signed and that accompanies the signature S.

Once the signature S is received, the server 18 raises the signature S to the power of v (mod m) to get a resulting value. Then, the server 18 compares the resulting value to the received message M, as signed data. Only when the resulting value matches the received message M, the server 18 validates the signature S.

Alternatively, instead of verifying the signature, when the server 18 receives neither data to be signed nor a corresponding digest, the server 18 verifies that a data structure relating to the received signature is correct.

The server 18 is thus preferably able to validate (or not) that a received signature S is correct.

The server 18 accesses a database stored in a memory (not represented) that is included within or connected to the server 18.

The database may include a first correspondence table that registers a set of enrolled users, as potential requesters of a proof(s) of one or several pieces of user information. The correspondence table includes, for data, like e.g. an IMSI, an IMEI and/or an MSISDN, identifying a requester one or several associated predetermined data relating to the user information, like e.g. a set of pieces of user information, a user picture(s) and/or a user sound pattern(s). The associated predetermined data relating to the user information is used for generating a proof of a piece(s) of requester information.

The server 18 is configured to receive from a requester device, like e.g. the SE 12, a message including a request for proving one or several pieces of first user information and data, like e.g. an IMSI, an IMEI and/or an MSISDN, identifying a requester.

Once the requester is identified thanks to the data identifying the requester, the server 18 verifies whether the identified requester is or is not enrolled.

Only if the identified requested is enrolled, the server 18 authorizes to continue a data processing.

The server 18 is configured to generate requester authentication data and data identifying a transaction.

The requester authentication data may be of any type. The requester authentication data may be a password, a passphrase or any other credential. The requester authentication data may be restricted in use, like e.g. in a predefined time period or for a predefined threshold value of use, such as an OTP, or permanent. The requester authentication data may be user dependent, like e.g. particular biometric data, such as a particular fingerprint amongst several ones.

The server 18 updates the correspondence table by adding the generated requester authentication data and the associated generated data identifying a transaction.

Once the requester authentication data is generated, the server 18 is configured to generate a proof(s) of one or several pieces of user information.

The (or each) proof(s) of one or several pieces of user information uses the piece(s) of user information to be proven and the requester authentication data. The piece(s) of user information to be proven is either predetermined or provided by the requester device, like e.g. the SE 12.

The server 18 updates the correspondence table by adding the generated proof(s) of one or several pieces of user information.

The server 18 is configured to send back to the requester device a message including the proof of first user information and associated data identifying the transaction.

Optionally, prior to a sending of such a proof message, the server 18 signs data to be sent. To sign the data to be sent, the server 18 uses a private key Kspriv relating to the server 18 and a data signature algorithm, like e.g. an RSA type algorithm, that are both stored at the server side. A resulting server signature allows proving that the originator of the proof message is the server 18.

Optionally, prior to a sending of the proof message, the server 18 ciphers data to be sent. To cipher the data to be sent, the server 18 uses either a public key relating to the requester device or a key shared between the requester device and the server 18 and a data ciphering algorithm, like e.g. a DES or 3DES type algorithm.

The server 18 is configured to receive from a verifier device, like e.g. the SE 12, a message including a request for getting authentication data associated with data identifying a transaction and the data identifying the transaction.

The server 18 gets, based on the data identifying the transaction, within the correspondence table the concerned first user authentication data.

The server 18 is configured to send back to the verifier device a message including the first user authentication data associated with the data identifying the transaction.

Optionally, prior to a sending of such a user authentication message, the server 18 signs data to be sent. To sign the data to be sent, the server 18 uses a private key Kspriv relating to the server 18 and a data signature algorithm, like e.g. an RSA type algorithm, that are both stored at the server side. A resulting server signature allows proving that the originator of the proof message is the server 18.

Optionally, prior to a sending of the proof message, the server 18 ciphers data to be sent. To cipher the data to be sent, the server 18 uses either a public key relating to the verifier device or a key shared between the verifier device and the server 18 and a data ciphering algorithm, like e.g. a DES or 3DES type algorithm.

FIG. 2 depicts an exemplary embodiment of a message flow 20 that involves the SE 12, the phone 14 and the server 18.

It is assumed that, at the client side, the SE 12 supports the invention requester and verifier applications.

It is assumed that the first user 11 of the phone 14 is enrolled at the server 18 side and desires to get a proof of her or his age, as a piece of user information, among other pieces of user information that are stored within the memory 124.

It is assumed that the phone 14 exchanges with the server 18 by using e.g. HyperText Transfer Protocol (or HTTP) and/or Short Message Service (or SMS) type messages. However, any other data communication protocol between the phone 14 and the server 18, like e.g. a secured data communication protocol (securing in confidentiality and/or in integrity the data thus exchanged), such as a Transport Layer Security (or TLS) protocol, may be used additionally to the HTTP and/or SMS protocol(s).

Firstly, the SE 12 is under the first user 11 control.

The first user 11 (not represented) accesses and triggers, through the phone 14 MMI, an execution of the requester application.

The SE 12 sends, through the phone 14, to the server 18 a message 22 including a request for proving the first user age and an IMSI, as data identifying the first user 11.

Prior to a sending of the request message 22, the SE 12 may sign and/or cipher the data to be sent.

After a possible verification of a received SE 12 signature and/or a possible decipherment of the received data, the server 18 generates 24 an OTP 1, as requester authentication data, and a random RND, as data identifying the first user 11.

Then, the server 18 generates 26 a proof of the first user age by using the first user age and the OTP 1.

The proof of the first user age is, for instance, a first user identity picture that contains both the first user age and the OTP 1, like e.g. "01765505".

The first user identity picture may further contain the RND, like e.g. "98126".

The first user age, like e.g. 17 years, is e.g. printed over the first user identity picture in plain text.

Likewise, the OTP1 is e.g. printed over the first user identity picture in plain text.

The server 18 sends, through the phone 14, to the SE 12 a message 28 including, as a request response, the proof of the first user age and the associated RND.

Optionally, the last message 28 further includes a digital signature relating to an authority.

After a possible verification of the authority signature, the SE 12 sends to the phone 14 a message 210 including a request for presenting the proof of the first user age.

The phone 14 presents 212 the proof of the first user age by e.g. displaying, through the phone display screen 142, the first user identity picture with the OTP1 and the associated RND.

The second user 19 (not represented) gets the proof of the first user age by e.g. seeing it with the OTP1 and the associated RND.

Secondly, the SE 12 is now under the second user 19 control.

The second user 19 accesses and triggers, through the phone 14 MMI, an execution of the verifier application.

The second user 19 uses e.g. the phone 14 MMI to enter the RND.

The SE 12, as a verifier device, sends, through the phone 14, to the server 18 a message 214 including a request for getting an OTP associated with an associated RND and the RND.

The server 18 gets 216 an OTP 2 that is associated with the received RND. To get the OTP 2, the server 18 retrieves the OTP 2 by consulting the correspondence table by using the received RND.

The server 18 sends, through the phone 14, to the SE 12 a message 218 including OTP 2 associated with the RND.

The SE 12 sends to the phone 14 a message 220 including a request for presenting the OTP 2.

The phone 14 presents 222 the OTP 2 by e.g. displaying, through the phone display screen 142, the OTP2.

The second user 19 compares (not represented) the OTP 2 to the OTP 1.

Alternately, instead of the second user 19, the SE 12 interprets and compares the OTP 2 to the OTP 1 without needing to send any OTP 2 presentation message to the phone 14. According to such an alternative, the SE 12 does or does not authenticate the first user age based on an OTP comparison result, namely when the OTPs match or when the OTPs do not match respectively.

If the OTP 2 and the OTP 1 are distinct from each other, then the second user 19 does not validate the first user age.

Otherwise, i.e. only if the OTP 2 matches the OTP 1, the second user validates or authenticates the first user age.

The invention solution is user friendly since a person uses her/his terminal, like e.g. a mobile phone, for proving a piece(s) of personal information.

The invention solution allows accessing, in a seamless, quick and secure manner, a proof of a piece(s) of personal information.

The embodiment that has just been described is not intended to limit the scope of the concerned invention. Other embodiments may be given. As another embodiment example, instead of the SE 12, the phone 14, as standalone device, supports one or two applications, namely the requester and/or the verifier application(s).

The invention claimed is:

1. A method for proving at least one piece of user personal information, wherein the method comprises the following steps:
   a) sending, from a first device to a server, data identifying a requester and, as a first request, a request for receiving at least one proof of at least one piece of user personal information;
   b) generating, by the server, requester authentication data and associated transaction identifying data;
   c) generating, by the server, a proof of user personal information using the at least one piece of user information and the requester authentication data, the proof of user personal information being a user identity picture including the at least one piece of user personal information and the requester authentication data, the proof of user personal information not revealing any other user personal information;
   d) sending, from the server to the first device, as a first request response, the proof of user personal information and the associated transaction identifying data, wherein the first request response does not reveal any other user personal information;
   e) presenting, by the first device, the proof of user personal information;
   f) obtaining, by a second device, from either the first device or a verifier, the transaction identifying data;
   g) sending, from the second device to the server, the transaction identifying data and, as a second request, a request for receiving user authentication data associated with transaction identifying data;
   h) sending, from the server to the second device, as a second request response, user authentication data associated with the transaction identifying data;
   i) presenting, by the second device, the received user authentication data;
   j) validating, by the verifier, that the at least one piece of user personal information is genuine, only if the received user authentication data matches the requester authentication data.

2. Method according to claim 1, wherein the proof of user personal information includes at least one visual element and/or at least one sound element.

3. Method according to claim 2, wherein the at least one visual element includes at least one element of the following group:
   at least one picture relating to the requester;
   at least one facial image relating to the requester;
   at least one palm print relating to the requester;
   at least one fingerprint relating to the requester;
   at least one iris print relating to the requester;
   at least one bar code relating to the requester authentication data;
   at least one Quick Response code relating to the requester authentication data;
   at least one flash code relating to the requester authentication data;
   at least one three dimension code relating to the requester authentication data.

4. Method according to claim 1, wherein the proof of user personal information further includes a digital signature relating to an authority.

5. Method according to claim 1 wherein the first device comprises and/or is connected to at least one display screen for presenting the proof of user personal information.

6. Method according to claim 1, wherein, prior to comparing the received user authentication data to the requester authentication data, the second device obtains, from the first device, the requester authentication data, and the second device interprets at least the requester authentication data.

7. A server for proving at least one piece of user personal information, the server comprising:
   a hardware processor, wherein the hardware processor is configured to:
      receive, from a first requester device, data identifying a requester and, as a first request, a request for receiving at least one proof of at least one piece of user personal information;
      generate requester authentication data and transaction identifying data;
      generate a proof of user personal information using the at least one piece of user personal information and the requester authentication data, the proof of user personal information being a user identity picture including the at least one piece of user personal information and the requester authentication data, the proof of user personal information not revealing any other user personal information;
      send, to the first device, as a first request response, the proof of user personal information and the associated transaction identifying data, wherein the first request response does not reveal any other user personal information;
      receive, from a second device, the transaction identifying data and, as a second request, a request for receiving user authentication data associated with the transaction identifying; and
      send, to the second device, as a second request response, user authentication data associated with the transaction identifying data.

8. A first device for proving at least one piece of user personal information, the first device comprising:
   a hardware processor, wherein the hardware processor is configured to:
      send, to a server, data identifying a requester and, as a first request, a request for receiving at least one proof of at least one piece of user personal information;
      receive, from the server, as a first request response, a proof of user personal information and associated transaction identifying data, wherein the proof of user personal information is a user identity picture including the at least one piece of user personal information and requester authentication data, and wherein the proof of user personal information and the first request response message do not reveal any other user personal information; and
      present the proof of user personal information.

9. A system for proving at least one piece of user personal information, the system comprising:
   a server including a hardware processor;
   a first device including a hardware processor, the hardware processor of the first device being configured to send, to the server, data identifying a requester and, as a first request, a request for receiving at least one proof of at least one piece of user personal information; and
   a second device including a hardware processor,
   wherein the hardware processor of the server is configured to:
      generate requester authentication data and associated transaction identifying data;
      generate a proof of user personal information using the at least one piece of user personal information and the requester authentication data, the proof of user personal information being a user identity picture including the at least one piece of user personal information and the requester authentication data, the proof of user personal information not revealing any other user personal information;

send, to the first device, as a first request response, the proof of user personal information and the associated transaction identifying data, wherein the first request response does not reveal any other user personal information;

wherein the hardware processor of the first device is configured to present the proof of user personal information;

wherein the hardware processor of the second device is configured to:
receive, from either the first device or a verifier, the transaction identifying data;
send, to the server, as a second request, a request for receiving user authentication data associated with the transaction identifying data;
receive, to from the server, as a second request response, user authentication data associated with the transaction identifying data;
present the received user authentication data; and wherein the verifier validates that the at least one piece of user personal information is genuine, only if the received user authentication data matches the requester authentication data.

\* \* \* \* \*